(12) United States Patent
Buttridge et al.

(10) Patent No.: US 8,678,357 B2
(45) Date of Patent: Mar. 25, 2014

(54) FLUID CONTACTOR-DIFFUSER TRAY ASSEMBLY

(75) Inventors: Ian G. Buttridge, Garland, TX (US); David Lin, Flower Mound, TX (US); Casey F. Bowles, Coppell, TX (US); SooWoong Kim, Flower Mound, TX (US); Michael J. Binkley, Glenn Heights, TX (US)

(73) Assignee: GTC Technology US, LLC, Houston, TX (US)

( * ) Notice: Subject to any disclaimer, the term of this patent is extended or adjusted under 35 U.S.C. 154(b) by 296 days.

(21) Appl. No.: 13/101,638

(22) Filed: May 5, 2011

(65) Prior Publication Data
US 2012/0024977 A1    Feb. 2, 2012

Related U.S. Application Data

(60) Provisional application No. 61/345,439, filed on May 17, 2010.

(51) Int. Cl.
*B01F 3/04* (2006.01)

(52) U.S. Cl.
USPC .................................. 261/114.1; 261/114.5

(58) Field of Classification Search
USPC ................................. 261/114.1, 114.2, 114.5
See application file for complete search history.

(56) References Cited

U.S. PATENT DOCUMENTS

| | | | |
|---|---|---|---|
| 2,582,826 A | 1/1952 | Glitsch | |
| 2,718,901 A | 9/1955 | Nutter | |
| 2,752,139 A * | 6/1956 | Huggins | 261/114.1 |
| 2,752,229 A | 6/1956 | Brown et al. | |
| 2,787,453 A | 4/1957 | Hibshman et al. | |
| 2,853,281 A | 9/1958 | Hibshman et al. | |
| 2,903,251 A | 9/1959 | Thrift | |
| 2,951,691 A | 9/1960 | Nutter | |
| 3,039,751 A | 6/1962 | Versluis | |
| 3,048,957 A * | 8/1962 | Middleton | 96/267 |
| 3,143,482 A * | 8/1964 | McLeod et al. | 202/234 |
| 3,146,280 A | 8/1964 | Forgrieve | |
| 3,233,708 A | 2/1966 | Glitsch | |
| 3,245,669 A | 4/1966 | Huggins et al. | |
| 3,282,576 A | 11/1966 | Bruckert et al. | |
| 3,287,004 A | 11/1966 | Nutter | |

(Continued)

OTHER PUBLICATIONS

Young, Lee W., "International Search Report" for the International Application PCT/IB11/02695 as mailed Apr. 17, 2012. (4 pages).

(Continued)

*Primary Examiner* — Robert A Hopkins
(74) *Attorney, Agent, or Firm* — Winstead PC

(57) ABSTRACT

A separations tray assembly for use in a fluid-fluid exchange column. The separations tray assembly is of the type where a first fluid, in a continuous phase, is directed across successive trays in a serpentine flow path. A second fluid, in a dispersed phase ascends through apertures in the tray thus inducing interaction and mass transfer with the first fluid. In accordance with one aspect of the present invention, the separations tray further includes a diffuser skirt, having apertures disposed therein, operatively coupled to a fluid channel. The diffuser skirt is operable to direct the first fluid to cover substantially an entire volumetric cross-flow window between successive separations trays and to induce stirring and mixing of the first fluid and the second fluid to effect efficient mass transfer.

23 Claims, 12 Drawing Sheets

(56) References Cited

U.S. PATENT DOCUMENTS

| | | |
|---|---|---|
| 3,338,566 A | 8/1967 | Kittel |
| 3,399,871 A | 9/1968 | Bon |
| 3,463,464 A | 8/1969 | Nutter et al. |
| 3,729,179 A | 4/1973 | Keller |
| 3,759,494 A | 9/1973 | Axelrod et al. |
| 3,959,419 A | 5/1976 | Kitterman |
| 4,120,919 A | 10/1978 | McClain |
| 4,133,852 A | 1/1979 | DiNicolantonio et al. |
| 4,174,363 A | 11/1979 | Bruckert |
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A | 7/1998 | Ulrich et al. |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 | 10/2003 | Gage |
| 6,722,639 B2 | 4/2004 | Ender et al. |
| 6,739,585 B1 | 5/2004 | Urbanski et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,235,158 B2 | 6/2007 | Matsumoto et al. |
| 7,270,315 B2 | 9/2007 | Burton et al. |
| 7,556,734 B2 | 7/2009 | Lee et al. |
| 7,712,728 B2 | 5/2010 | Kehrer |
| 7,896,039 B2 | 3/2011 | Bachmann et al. |
| 8,006,716 B2 | 8/2011 | Zhang et al. |
| 2002/0041040 A1 | 4/2002 | Fischer et al. |
| 2003/0067085 A1 | 4/2003 | Shakur et al. |
| 2004/0037759 A1 | 2/2004 | Van Vliet et al. |
| 2004/0151643 A1 | 8/2004 | McDougald et al. |
| 2004/0182013 A1 | 9/2004 | Kehrer |
| 2007/0126134 A1 | 6/2007 | Xu et al. |
| 2007/0295591 A1 | 12/2007 | Mosler |
| 2008/0245651 A1 | 10/2008 | Werlen et al. |
| 2008/0277260 A1 | 11/2008 | Binkley et al. |
| 2010/0288624 A1 | 11/2010 | Kim et al. |
| 2012/0118399 A1 | 5/2012 | Binkley et al. |
| 2012/0211347 A1 | 8/2012 | Kim et al. |
| 2012/0300577 A1 | 11/2012 | Buttridge et al. |

OTHER PUBLICATIONS

U.S. Appl. No. 13/401,601, Kim, SooWoong et al.
U.S. Appl. No. 13/449,122, Buttridge, et al.
U.S. Appl. No. 13/340,245, Binkley, et al.
Kister, Henry Z., "Distillation Design", ch. 6, pp. 265, 296, 331, 299-301, ch. 7, pp. 382-394, ch. 9, pp. 537-554, McGraw-Hill, 1992.
Kim, SooWoong et al., "U.S. Appl. No. 13/401,601," filed Feb. 21, 2012.
Buttridge, Ian et al., "U.S. Appl. No. 13/449,122," filed Apr. 17, 2012.
Binkley, Michael, "U.S. Appl. No. 12/408,333," filed Mar. 30, 2009.
Buttridge, Ian G. "U.S. Appl. No. 12/418,189," filed Apr. 3, 2009.
Buttridge, Ian G., "U.S. Appl. No. 13/564,881," filed Aug. 2, 2012.
U.S. Appl. No. 12/408,333, Binkley.
U.S. Appl. No. 12/775,895, Kim, SooWoong et al.
U.S. Appl. No. 12/418,189, Buttridge et al.
Glitsch, Inc., "Ballast Tray Design Manuel", Bulletin 4900, Sixth Edition, 1993, (40 pages).
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.
Kister, Henry Z., "Distillation Design", McGraw-Hill, 1992.

\* cited by examiner

FLUID CONTACTOR-DIFFUSER TRAY ASSEMBLY

CROSS-REFERENCE TO RELATED APPLICATIONS

The present invention claims priority from and incorporates by reference the entire disclosure of U.S. Provisional Patent Application No. 61/345,439, filed May 17, 2010. Additionally, the present application incorporates by reference the entire disclosure of U.S. patent application Ser. No. 12/408,333, filed Mar. 20, 2009, U.S. patent application Ser. No. 12/109,781, filed Apr. 25, 2008, and U.S. Provisional Patent Application No. 61/178,676, filed May 15, 2009.

BACKGROUND OF THE INVENTION

1. Field of the Invention

The present invention relates to mass-transfer trays for chemical process columns and, more particularly, but not by way of limitation, to an improved liquid-liquid contactor tray for facilitating increased mass transfer efficiency.

2. History of Related Art

Distillation columns have been developed and used for many decades to separate selected components from a multicomponent stream. The major "separations" process is commonly known in the art as "fractionation." Successful fractionation in a distillation column depends upon intimate contact between a heavier fluid and a lighter fluid. Some contact devices, such as, for example, trays, are characterized by relatively high pressure drop and relatively high fluid hold-up. One type of contact apparatus utilizes fluid in a vapor phase to contact fluid in a liquid phase. Another type of contact apparatus is structured packing. Structured packing is energy efficient as it exhibits low pressure drop and low fluid hold-up. However, these very properties at times make columns equipped with structured packing difficult to operate in a stable, consistent manner. Moreover, many applications simply require the use of trays.

A particularly effective tray in process columns is a sieve tray. Typically, the sieve tray is constructed with a plurality of apertures formed in a deck surface. The plurality of apertures permit ascending lighter fluid to flow into direct engagement with heavier fluid that is flowing across the sieve tray. When there is sufficient lighter-fluid flow upwardly through the sieve tray, the heavier fluid is prevented from running downwardly through the plurality of apertures (referred to as "weeping"). A small degree of weeping is normal in sieve trays while a larger degree of weeping is detrimental to the capacity and efficiency of the tray. Such trays may be either single-pass or multi-pass. In addition, such trays may incorporate serpentine flow, orbital flow, or uni-directional flow.

Another type of "separations" process involves mass transfer between two fluids which are both in a liquid state. This is commonly referred to as "fluid-fluid exchange." The primary advantage of fluid-fluid exchange over fluid-vapor exchange is an amount of process energy required. In the fluid-vapor exchange, substantial energy must be provided and consumed to boil a fluid into a vapor state and maintain the fluid in the vapor state for the duration of the process. In contrast, most fluid-fluid exchange processes operate at temperatures slightly above ambient temperature such as, for example, 90° F. resulting in significant energy savings.

In cases involving fluid-fluid exchange, there are specific performance issues that impact efficiency. In typical fluid-fluid exchange columns, a first fluid is in a continuous phase and a second fluid is in a dispersed phase. In one arrangement, the heavier fluid, in a continuous phase, is passed downwardly in a circuitous path across a series of horizontally disposed trays spaced in a vertical relationship, one to the other. The heavier fluid forms a fluid layer on the trays. Droplets of the lighter fluid, in a dispersed phase, ascend through the plurality of apertures and interact with the continuous fluid. This arrangement may be used, for example, in re-capture of an acid where the heavier fluid is water containing the acid and the lighter fluid is a selected solvent. In another arrangement, the heavier fluid is the dispersed phase and the lighter fluid is the continuous phase. In this arrangement, the heavier fluid forms droplets which fall downwardly through the plurality of apertures. The heavier fluid droplets fall through the lighter fluid, in continuous phase, flowing upwardly in a circuitous path across an underside of the trays. This arrangement may be used, for example in solvent recovery of Benzene from aromatics process streams.

In conventional fluid-fluid contactor trays, velocities of the continuous-phase fluid are very low relative to fluid-vapor columns. The low velocities in the continuous-phase fluid result in the continuous-phase fluid having minimal head pressure thereby inducing re-circulation and stagnation. Recirculation and stagnation reduces mass-transfer driving force. Tray areas where no mass transfer between the continuous-phase fluid and the dispersed-phase fluid occurs are referred to as "dead zones." Dead zones form in locations where the continuous-phase fluid stagnates thus exhausting the solvent absorption capability. Furthermore, the low velocities of the continuous-phase fluid result in the continuous-phase fluid tending to not cover an entire surface of a tray. Such incomplete tray coverage lessens an area of effective mass transfer and reduces an efficiency of the tray. These problems are generally present regardless of whether the heavier fluid or the lighter fluid is used as the continuous phase.

U.S. Pat. No. 7,556,734, assigned to AMT International Inc., teaches an exchange column for contacting liquid in a continuous phase with liquid in a dispersed phase. Contact between liquid in the continuous phase and liquid in the dispersed phase is enhanced by providing upstanding baffles on lower trays interspersed with depending baffles from trays above. In addition, flow distribution partitions extend along a flow path, between the baffles, to distribute liquid flow across the trays.

U.S. Pat. No. 4,247,521, assigned to Union Carbide Corporation, teaches a liquid-liquid contacting tray having a channelized liquid transfer means for transferring continuous phase liquid from a contacting zone on one side of the tray to a contacting zone on the other side of the tray. The channelized liquid transfer means includes a settling section operable to allow disengagement of the discontinuous phase liquid from the continuous phase liquid, and a pressure drop section.

U.S. Pat. No. 2,752,229 assigned to Universal Oil Products Company, teaches a tower for effecting countercurrent contacting of fluid streams, particularly liquid-liquid contacting. The tower includes a plurality of vertically spaced perforated liquid distributing decks extending across a confined chamber. Sloping liquid downpipe assemblies extend from a liquid receiving well on one deck to a liquid seal reservoir of the next lower deck. Use of the sloping downpipe ensures that the continuous-phase liquid moves in the same direction across successive trays thus creating a uni-directional flow path.

SUMMARY OF THE INVENTION

The present invention relates to a separations tray assembly for use in a fluid-fluid exchange column. The separations tray assembly is of the type where a first fluid, in a continuous phase, is directed across the tray in a cross-flow path. A second fluid, in a dispersed phase, ascends through apertures in the tray thus inducing interaction and mass transfer with the first fluid. In accordance with one aspect of the present invention, the separations tray further includes a diffuser skirt, having apertures disposed therein, operatively coupled to a fluid channel. The diffuser skirt is operable to direct the first fluid to cover substantially an entire surface of the separations tray and to induce stirring and mixing of the first fluid and the second fluid to effect efficient mass transfer.

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
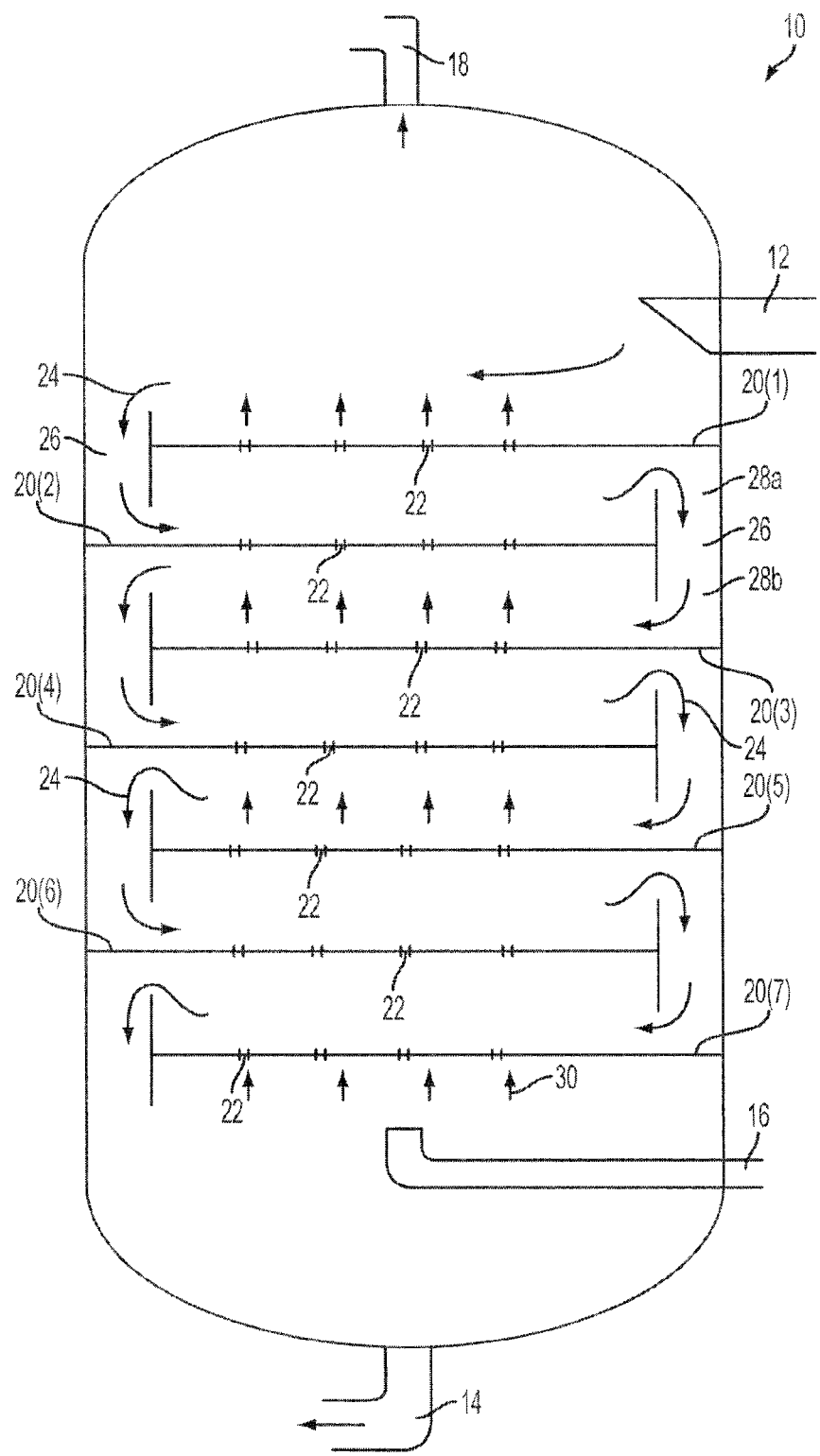
FIG. 1 is a side-elevational cross-sectional view of a prior art fluid-fluid exchange column.

Referring now to FIG. 1, there is shown a side-elevational cross-sectional view of a prior-art fluid-fluid exchange column. A fluid-fluid exchange column 10 includes a continuous-fluid-feeder line 12 and a first draw-off line 14. Also included are a dispersed-fluid feeder line 16 and a second draw-off line 18. A plurality of trays 20(1)-20(7) are disposed within the fluid-fluid exchange column 10. Typically, the fluid-fluid exchange column 10 is used in extraction processes such as, for example, extraction of an acid from water using a solvent.

Still referring to FIG. 1, the plurality of trays 20(1)-20(7) generally comprise a solid tray or deck having a plurality of apertures 22 disposed therein. The plurality of apertures 22 may include, for example, holes, slots, floating valves, or any other appropriate type of aperture. Separation trays such as, for example, the plurality of trays 20(1)-20(7) comprise at least one of cross-flow trays with downcomers and counter-flow trays without downcomers. In cross-flow trays, a lighter fluid 30 ascends through the plurality of apertures 22 and contacts a heavier fluid 24 moving across the plurality of trays 20(1)-20(7). In an active area, the heavier fluid 24 and the lighter fluid 30 mix and fractionation occurs. In counter-flow trays, both the lighter fluid 30 and the heavier fluid 24 pass through the plurality of apertures 22.

Still Referring to FIG. 1, in cross-flow operation, the heavier fluid 24, in a continuous phase, is introduced to, and substantially fills, the fluid-fluid exchange column 10 via the continuous-fluid-feeder line 12. The heavier fluid 24 is directed onto one of the plurality of trays 20(1)-20(7) such as, for example, the tray 20(2) by means of a fluid channel 26 from the tray 20(1) above. The fluid channel 26 is referred to as a "downcomer." The heavier fluid 24 moves across the tray 20(1) and enters the fluid channel 26 through a downcomer entrance 28(a) and then leaves through a downcomer exit 28(b). At the same time, the lighter fluid 30 in a dispersed phase is introduced to the fluid-fluid exchange column 10 via the dispersed-fluid feeder line 16. The lighter fluid 30 forms bubbles that rise through the heavier fluid 24. Typically, the bubbles of the lighter fluid 30 are approximately ¼ of an inch or smaller. The lighter fluid 30 rises through the fluid-fluid exchange column 10 and forms a coalesced layer on an underside of each of the plurality of trays 20(1)-20(7). The plurality of apertures 22 facilitate passage of the lighter fluid 30 through each of the plurality of trays 20(1)-20(7) allowing interaction with the heavier fluid 24. Remaining heavier fluid 24 is removed from the fluid-fluid exchange column 10 via the first draw-off line 14. Likewise, remaining lighter fluid 30 is removed from the fluid-fluid exchange column 10 via the second draw-off line 18.

For example, in the case of an extraction column, heavier fluid 24 such as, for example, water containing acetic acid is pumped into the fluid-fluid exchange column 10 in a continuous phase, via continuous-fluid feeder-line 12. The heavier fluid 24 comprising the water-acid mixture descends through the fluid-fluid exchange column 10 in a circuitous route passing over each of the plurality of trays 20(1)-20(7) in alternating directions. Simultaneously, lighter fluid 30 such as, for example, a solvent containing an alkyl acetate is introduced via the dispersed-fluid feeder line 16. The lighter fluid 30 comprising the solvent-alkyl acetate mixture bubbles up through the water-acid mixture and coalesces on the underside of each of the plurality of trays 20(1)-20(7). The solvent interacts with the water-acid mixture and gradually absorbs the acetic acid. Thus, the concentration of acetic acid is greatest in water-acid mixture moving across the tray 20(1). The concentration of acetic acid in the water decreases as the water-acid mixture moves across each successive tray of the plurality of trays 20(1)-20(7) until, finally, residual water (also referred to as "raffinate") is removed from the fluid-fluid exchange column 10 via the first draw-off line 14. In similar fashion, the concentration of acetic acid in the solvent increases with each successive tray until acetic acid extract is removed from the fluid-fluid exchange column 10 via the second draw-off line 18.

Figure 2:
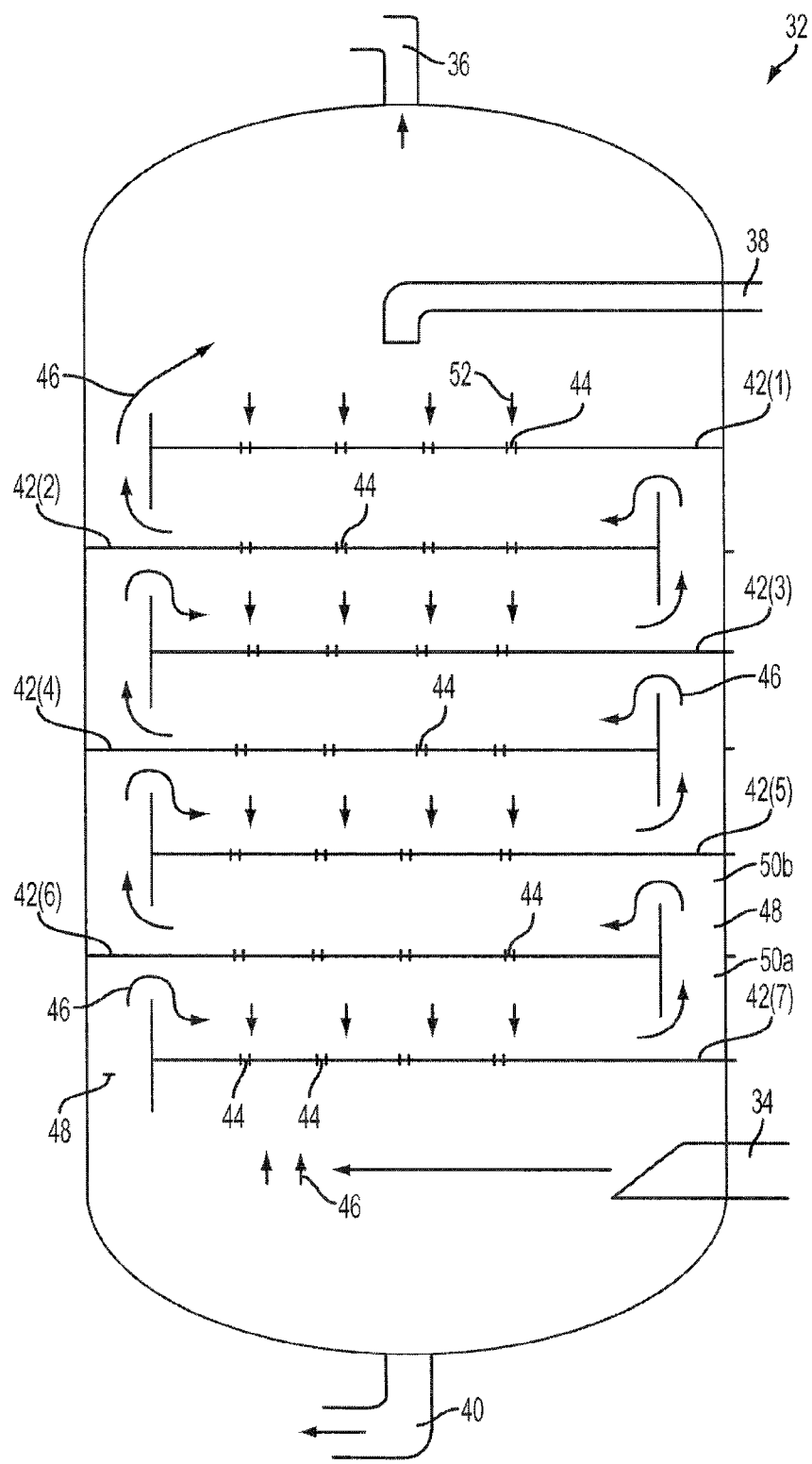
FIG. 2 is a side-elevational cross-sectional view of a prior-art fluid-fluid exchange column.

Referring now to FIG. 2, there is shown a side-elevational cross-sectional view of a prior-art fluid-fluid exchange column. A fluid-fluid exchange column 32 includes a continuous-fluid-feeder line 34 and a first draw-off line 36. Also included are a dispersed-fluid feeder line 38 and a second draw-off-line 40. A plurality of trays 42(1)-42(7) are disposed within the fluid-fluid exchange column 32. A fluid-fluid exchange column such as, for example, the fluid-fluid exchange column 32 may be used in a process such as, for example, extraction of benzene from water.

Still referring to FIG. 2, the plurality of trays 42(1)-42(7) generally comprise a solid tray or deck having a plurality of apertures 44 disposed therein. The plurality of apertures 44 may include, for example, holes, slots, floating valves, and other appropriate types of apertures. In operation, a lighter fluid 46, in a continuous phase, is introduced to, and substantially fills, the fluid-fluid exchange column 32 via the continuous-fluid-feeder line 34. The lighter fluid 46 is directed onto a tray such as, for example, the tray 42(6) by means of a fluid channel 48 from the 42(7) tray below. The fluid channel 48 is referred to as an "upcomer." The lighter fluid 46 moves across the tray 42(7) and enters an upcomer entrance 50(a). The lighter fluid 46 then exits the fluid channel 48 via an upcomer exit 50(b). A heavier fluid 52, in a dispersed phase, is simultaneously introduced to the fluid-fluid exchange column 32 via the dispersed-fluid feeder line 38. The heavier fluid 52 forms bubbles that descend through the lighter fluid 46. Typically, the bubbles of the heavier fluid 52 are approximately ¼ of an inch or smaller. The heavier fluid 52 descends through the fluid-fluid exchange column 32 and forms a coalesced layer on a top surface of each of the plurality of trays 42(1)-42(7). The plurality of apertures 44 facilitate passage of the heavier fluid 52 through each of the plurality of trays 42(1)-42(7) allowing interaction with the lighter fluid 46. Residual lighter fluid 46 is removed from the fluid-fluid exchange column 32 via the first draw-off line 36. Likewise, residual heavier fluid 52 is removed from the fluid-fluid exchange column 32 via the second draw-off line 40.

FIG. 2 is included herein to demonstrate that either a heavier fluid or a lighter fluid may be used in operation as the continuous phase with appropriate modifications to a structure of the fluid-fluid exchange column. For ease and clarity of discussion, the following exemplary embodiments will be described by way of example as having a heavier fluid in the continuous phase. However, one skilled in the art will recognize that, alternatively, each of the embodiments below could function with a lighter fluid as the continuous phase and flow redirected in accordance therewith.

Figure 3:
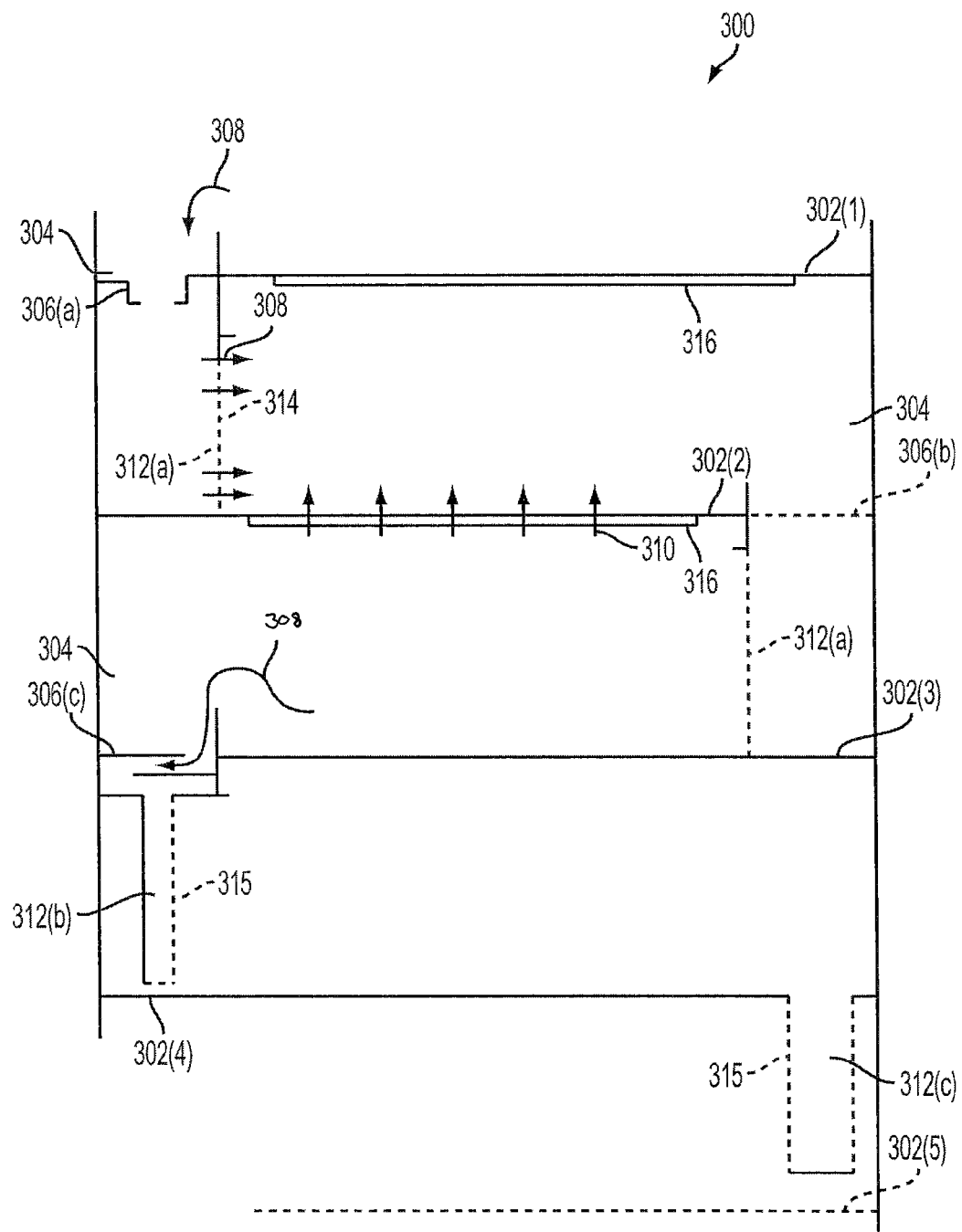
FIG. 3 is a diagrammatic, side-elevational, cross-sectional view of a fluid-fluid exchange column according to an exemplary embodiment.

Referring now to FIG. 3, there is shown a diagrammatic, side-elevational, cross-sectional view of a fluid-fluid exchange column according to an exemplary embodiment In various embodiments, a fluid-fluid exchange column 300 includes a plurality of trays 302(1)-302(5) and a plurality of fluid channels 304. In various embodiments, the plurality of fluid channels 304 may include, for example, a downcomer or an upcomer as described hereinabove. In a typical embodiment, a tray such as, for example, the tray 302(2), allows fluid to enter and exit via the fluid channels 304. In a typical embodiment, the fluid channels 304 include a plurality of orifice constrictions 306(a)-306(c) disposed therein. The plurality of orifice constrictions 306(a)-306(c) may utilize a variety of pressure-drop control devices such as, for example, an envelope-pipe reducer 306(a), a perforated plate 306(b), a plurality of baffles 306(c), and the like. In a typical embodiment, plurality of the orifice constrictions 306(a)-306(c) restrict the flow of fluid moving through the fluid channels 304 and prevent backflow of either a continuous-phase fluid 308 or a dispersed-phase fluid 310 therethrough. In a typical embodiment, the plurality of trays 302(1)-302(5) include a diffuser skirt 312(a). The diffuser skirt 312(a) includes a diffuser body and plurality of apertures 314 therein. The diffuser skirt 312(a) depends from an underside of the fluid channel 304. As shown by way of example in FIG. 3, the diffuser skirt 312(a) extends entirely between two trays such as, for example, the trays 302(1) and the tray 302(2); however, one skilled in the art will recognize that the diffuser skirt 312(a) may not extend entirely between the two trays 302(1) and 302(2) leaving a clearance space. Although the plurality of apertures 314 are shown by way of example in FIG. 3 as perforations, one skilled in the art will recognize that, in alternative embodiments, the plurality of apertures 314 may include slots, louvers, and the like. The plurality of apertures 314 are illustrated by way of example in FIG. 3 as being evenly spaced around the diffuser skirt 312(a); however, the plurality of apertures 314 may alternatively be grouped to direct the continuous-phase fluid 308 in a desired direction. By way of example, the fluid-fluid exchange column 300 is shown in FIG. 3 as containing five trays 302(1)-302(5); however, one skilled in the art will recognize that, in alternative embodiments, any number of trays may be utilized.

Referring still to FIG. 3, in various embodiments, the fluid-fluid exchange column 300 includes a first conduit 312(b). In a typical embodiment, the first conduit 312(b) includes a plurality of apertures 315 disposed therein. In various embodiments, the first conduit 312(b) depends from an underside of the fluid channel 304. As shown by way of example in FIG. 3, the first conduit 312(b) does not extend entirely between two trays such as, for example, the tray 302(3) and the tray 302(4); however, one skilled in the art will recognize that, in alternative embodiments, the first conduit 312(b) may extend entirely between the two trays 302(3) and 302(4). Although, the plurality of apertures 315 are shown by way of example in FIG. 3 as perforations; one skilled in the art will recognize that, in alternative embodiments, the plurality of apertures 315 may include slots, louvers, or the like. The plurality of apertures 315 are illustrated by way of example in FIG. 3 as being evenly spaced around the first conduit 312(b); however, the plurality of apertures 315 may alternatively be grouped to direct the continuous-phase fluid 308 in a desired direction.

Referring still to FIG. 3, in certain embodiments, the plurality of apertures 315 are disposed on both an interior face and an exterior face of a second conduit 312(c). Such an arrangement facilitates mixing of the continuous-phase fluid 308 and the dispersed-phase fluid 310 on the exterior side of the second conduit 312(c). Additionally, this arrangement allows an active area, where mixing of the continuous-phase fluid 308 and the dispersed-phase fluid 310 occurs, to extend entirely to the outer wall 301 of the fluid-fluid exchange column 300.

Referring still to FIG. 3, in certain embodiments, a coalescing element 316 may be included on any of the plurality of trays 302(1)-302(5) to facilitate coalescing of the dispersed-phase fluid 310. Although the coalescing element 316 is shown in FIG. 3 as being disposed on an underside of the plurality of trays 302(1)-302(2), one skilled in the art will recognize that the, in alternative embodiments, coalescing element 316 may be located on a top surface of the plurality of trays 302(1)-302(2) in cases where the dispersed-phase fluid 310 is heavier than the continuous-phase fluid 308.

Still referring to FIG. 3, during operation, the continuous-phase fluid 308 moves across a tray such as, for example, the tray 302(1), into the fluid channel 304, and through at least one of the plurality of orifice constrictions 306(a)-306(c). As the continuous-phase fluid 308 moves through at least one of the plurality of orifice constrictions 306(a)-306(c), flow of the continuous-phase fluid 308 is restricted resulting in increased velocity of the continuous-phase fluid 308. The added velocity further facilitates stirring and mixing of the continuous-phase fluid 308 and the dispersed-phase fluid 310 forcing the continuous-phase fluid 308 to be spread entirely across a cross-flow volumetric window between successive trays such as, for example, the trays 302(1) and 302(2) preventing stagnation and reducing recirculation (also referred to as "eddy current") in the continuous-phase fluid 308. Additionally, according to an exemplary embodiment, thrust tabs (not explicitly shown in FIG. 3) may be incorporated in conjunction with the plurality of apertures 314 or 315 to direct the continuous-phase fluid 308 to cover the entire volumetric cross-flow window between each of the plurality of trays 302(1)-302(5).

Figure 4:
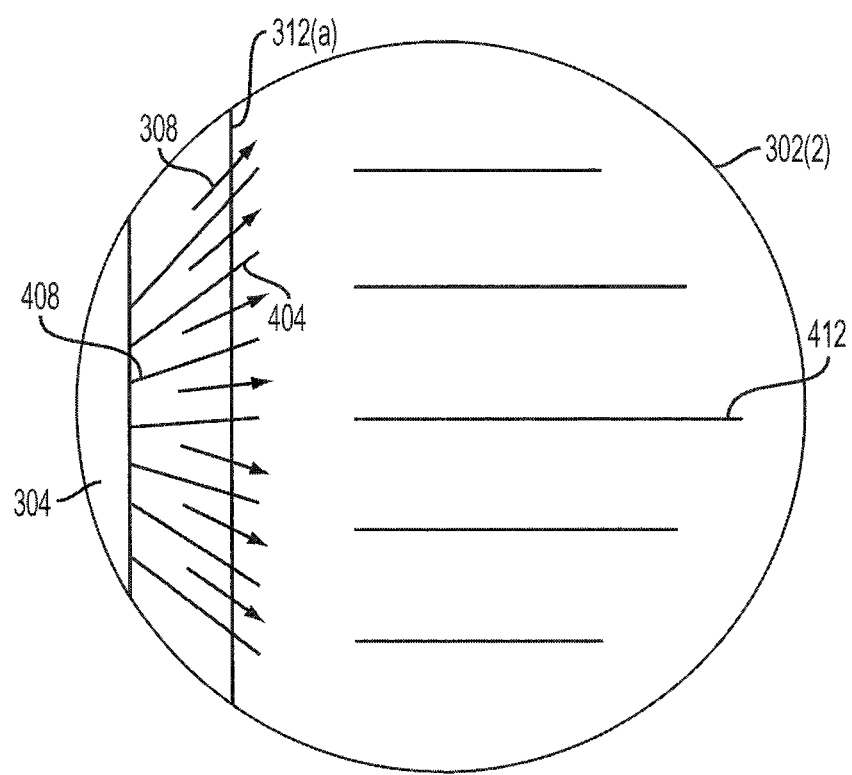
FIG. 4 is a top-plan, diagrammatic view of a tray according to an exemplary embodiment.

Referring now to FIG. 4, there is shown a top-plane, diagrammatic view of a tray according to an exemplary embodiment. In a typical embodiment, a tray such as, for example, the tray 302(2) includes a diffuser skirt 312(a), a plurality of baffles 408, and a plurality of vanes 412. In a typical embodiment, the diffuser skirt 312(a) forms a chord across a surface of a tray such as, for example, the tray 302(2). As illustrated in FIG. 4, a plurality of tabs 404 may be incorporated with the plurality of apertures 314 (shown in FIG. 3) to direct the continuous-phase fluid 308 in a desired direction thus further inducing the continuous-phase fluid 308 to cover the entire volumetric cross-flow window of a tray such as, for example, the tray 302(2). The plurality of baffles 408 may be incorporated within the fluid channel 304 to direct the continuous-phase fluid 308 to cover the entire volumetric cross-flow window of a tray such as, for example, the tray 302(2). Additionally, the plurality of vanes 412 may be incorporated to impart additional velocity to the continuous-phase fluid 308 and to further direct the continuous-phase fluid 308 to cover the entire volumetric cross-flow window of a tray such as, for example, the tray 302(2).

Figure 5:
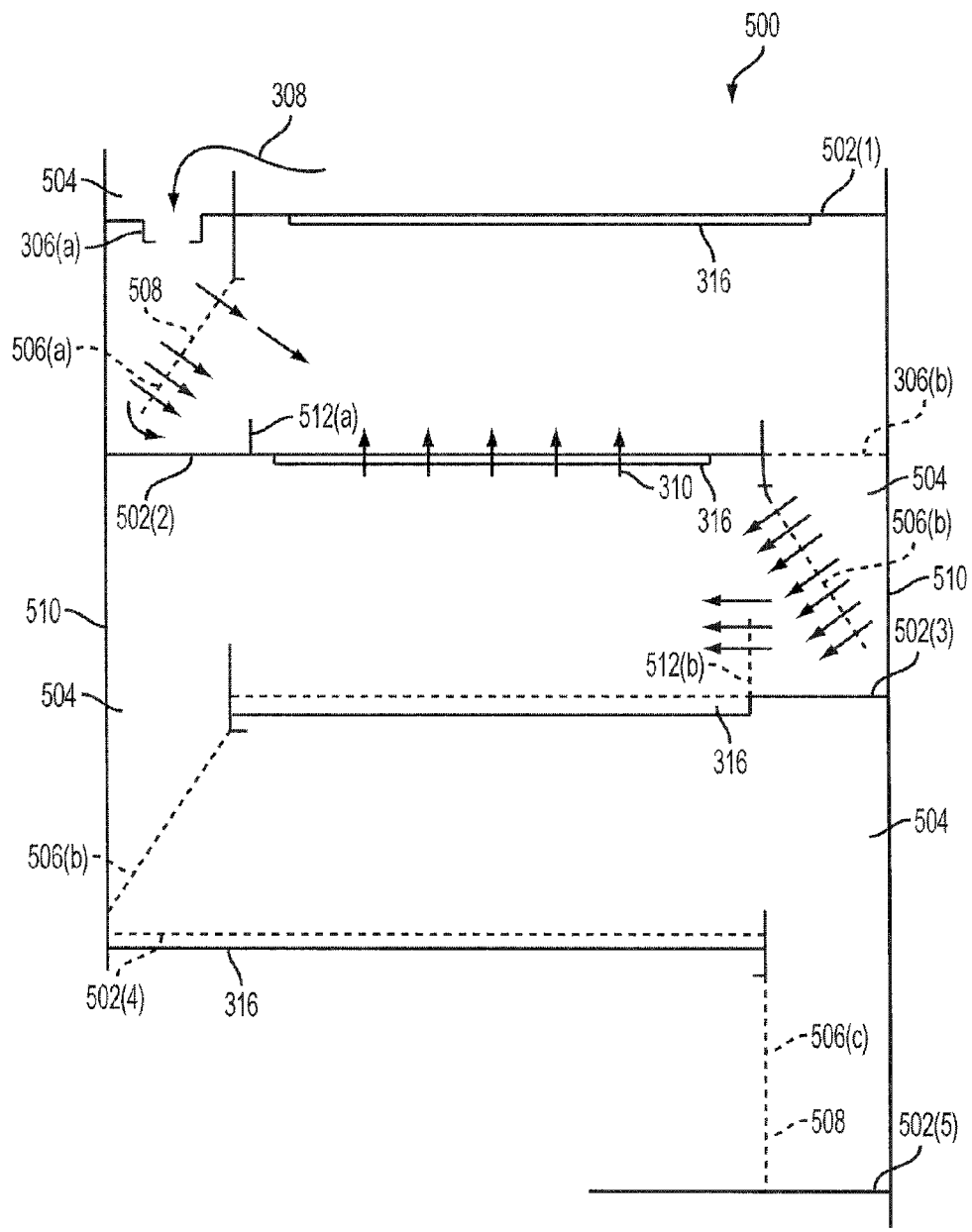
FIG. 5 is a diagrammatic, side-elevational, cross-sectional view of a fluid-fluid exchange column according to an exemplary embodiment.

Referring now to FIG. 5, there is shown a diagrammatic, side-elevational, cross-sectional view of a fluid-fluid exchange column according to an exemplary embodiment. In a typical embodiment, a fluid-fluid exchange column 500 includes a plurality of trays 502(1)-502(5). By way of example, the fluid-fluid exchange column 500 is illustrated in FIG. 5 as having five trays 502(1)-502(5); however, one skilled in the art will recognize that, in alternative embodiments, any number of trays could be utilized. In a typical embodiment, a tray such as, for example, the tray 502(2) allows fluid to enter and exit via fluid channels 504. In various embodiments, the plurality of fluid channels 504 may include, for example, a downcomer or an upcomer as described hereinabove. In various embodiments, the fluid channels 504 include at least one of the plurality of orifice constrictions 306(a)-306(c) (shown in FIG. 3) disposed therein. The plurality of orifice constrictions 306(a)-306(c) are described above with respect to FIG. 3. In a typical embodiment, a plurality of diffuser skirts 506(a)-506(c), each having a diffuser body and a plurality of apertures 508 disposed therein, depends from an underside of the fluid channels 504. As shown by way of example in FIG. 5, the plurality of diffuser skirts 506(a)-506(c) extends substantially between two trays such as, for example, the tray 502(1) and the tray 502(2); however, one skilled in the art will recognize that, in alternative embodiments, the plurality of diffuser skirts 506(a)-506(c) may not extend entirely to, for example, the tray 502(2) leaving a clearance space between the plurality of diffuser skirts 506(a)-506(c) and the tray 502(2) for additional flow.

Still Referring to FIG. 5, in contrast to FIG. 3, the plurality of diffuser skirts 506(a)-506(c) are, in a typical embodiment, angled towards an outer wall 510 of the fluid-fluid exchange column 500 thereby inducing turbulence in the continuous-phase fluid 308. Although, the plurality of apertures 508 are shown by way of example in FIG. 5 as perforations; one skilled in the art will recognize that the plurality of apertures 508 could include slots, louvers, and other configurations. The plurality of apertures 508 are illustrated by way of example in FIG. 5 as being evenly spaced around the plurality of diffuser skirts 506(a)-506(c); however, the plurality of apertures 508 may alternatively be grouped to create a specific fluid flow Additionally, in various embodiments, at least one of inlet weirs 512(a)-512(c) may be disposed on a top surface of a tray such as, for example, the trays 502(2)-20(4) medially of the plurality of diffuser skirts 506(a)-506(c). In some embodiments, a diffuser skirt such as, for example, the plurality of diffuser skirts 506(b) may extend entirely to the outer wall 510 of the fluid-fluid exchange column 500. In this arrangement, the plurality of diffuser skirts 506(b) also performs the function of at least one of the orifice constrictions 306(a)-306(c). Such an arrangement also allows an active area associated with a tray such as, for example, the tray 502(4) to extend entirely to the outer wall 510 of the fluid-fluid exchange column 500. In addition, in some embodiments, a diffuser skirt 506(c) may seal upon a floor of an adjacent tray such as, for example, the tray 502(5).

Still Referring to FIG. 5, in certain embodiments, the coalescing element 316 may be included on any of the plurality of trays 502(1)-502(5) to facilitate coalescing of the dispersed-phase fluid 310. Although the coalescing element 316 is shown in FIG. 5 as being disposed on an underside of a tray such as, for example, the trays 502(1)-502(2), one skilled in the art will recognize that, in alternative embodiments, the coalescing element 316 could be located on a top surface of a tray such as, for example, the trays 502(1)-502(2) in those flow configurations where the dispersed-phase fluid 310 is heavier than the continuous-phase fluid 308 and the flow is redirected in accordance therewith.

Still referring to FIG. 5, during operation, the continuous-phase fluid 308 moves across a tray such as, for example, the tray 502(1), into the fluid channel 504, and through at least one of the plurality of orifice constrictions 306(a)-306(c). As the continuous-phase fluid 308 moves through the plurality of diffuser skirts 506(a)-506(c). In a typical embodiment, the diffuser skirts 506(a)-506(c) are angled towards an outer wall 510 of the fluid-fluid exchange column 500. In a typical embodiment, flow restriction imposed by the plurality of apertures 508 results in additional velocity being imparted to the continuous-phase fluid 308. The added velocity further facilitates stirring and mixing of the continuous-phase fluid 308 and the dispersed-phase fluid 310. Such added velocity also forces the continuous-phase fluid 308 to be spread entirely across a volumetric cross-flow window between successive trays such as, for example, the trays 502(1)-502(2) thus preventing stagnation and reducing recirculation of the continuous-phase fluid 308. In addition, the continuous-phase fluid 308 passes through the plurality of apertures 508 at right angles to the plurality of diffuser skirts 506(a)-506(c). In various embodiments, some of the continuous-phase fluid 308 will pass over, for example, a solid inlet weir 512(a). In an alternative embodiments, some of the continuous-phase fluid 308 could pass through a perforated inlet weir 512(b). The interaction of the plurality of diffuser skirts 506(a)-506(c)

and the perforated inlet weir 512(*b*) introduce turbulence to the continuous-phase fluid 308. The directional turbulence causes stirring of the continuous-phase fluid 308 thus facilitating interaction with the dispersed-phase fluid 310. Additionally, thrust tabs (not explicitly shown in FIG. 5) may be incorporated in conjunction with the plurality of apertures 508 of the plurality of diffuser skirts 506(*a*)-506(*c*) or the perforated inlet weir 512(*b*) to direct the continuous-phase fluid 308 to cover an entire volumetric cross-flow window of the plurality of trays 502(1)-502(5).

Figure 6:
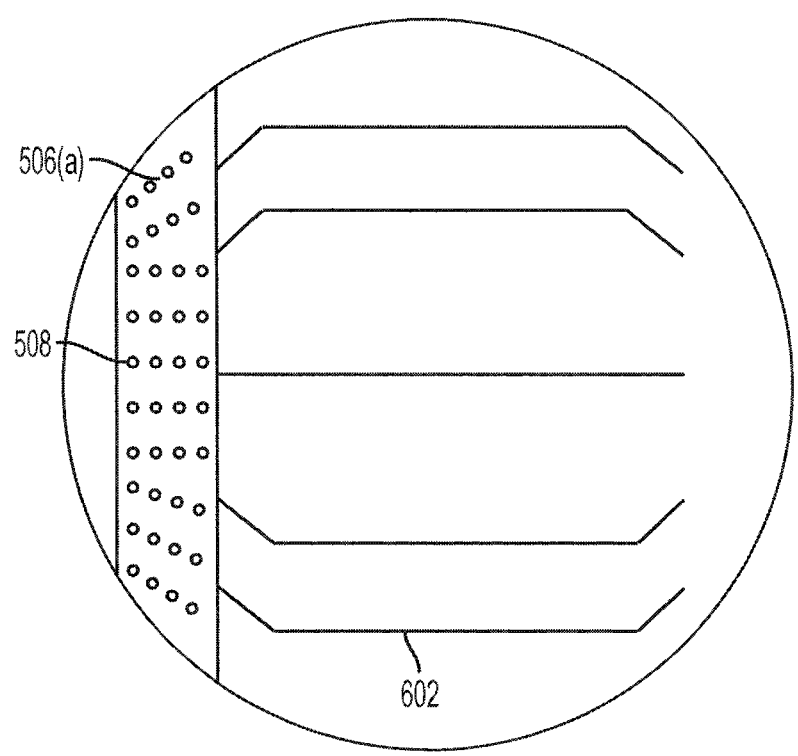
FIG. 6 is a top-plan, diagrammatic view of a tray according to an exemplary embodiment.

Referring now to FIG. 6, there is shown a top-plane, diagrammatic view of a tray according to an exemplary embodiment. In a typical embodiment a tray such as, for example, the tray 502(2) includes a diffuser skirt 506(*a*) and a plurality of vanes 602. The diffuser skirt 506(*a*) forms a chord across a surface of the tray 502(2). As illustrated in FIG. 6, thrust tabs (not explicitly shown in FIG. 6) may be incorporated with the plurality of apertures 508 to direct to the continuous-phase fluid 308 (not shown in FIG. 6) in a desired direction thereby inducing the continuous-phase fluid 308 to cover an entire volumetric cross-flow window of a tray such as, for example the tray 502(2). Additionally, at least one or a plurality of vanes 602 may be disposed on a tray such as, for example, the tray 502(2) to impart additional velocity to the continuous-phase fluid 308 and to further direct the continuous-phase fluid 308 to cover the entire volumetric cross-flow window of a tray such as, for example, the tray 502(2). According to exemplary embodiments, the vanes 602 may be curved, angled, or straight to reduce eddy currents in the continuous-phase fluid 308 and the dispersed-phase fluid 310 (not shown in FIG. 6). Reducing eddy currents prevents recirculation of either the continuous-phase fluid 308 or the dispersed-phase fluid 310 and improves efficiency of the plurality of trays 502(1)-502(5). The plurality of apertures 508 are illustrated by way of example in FIG. 6 as being evenly spaced around the diffuser skirt 506(*a*)-506(*c*); however, the plurality of apertures 508 may alternatively be grouped to create a specific fluid flow.

Figure 7A:
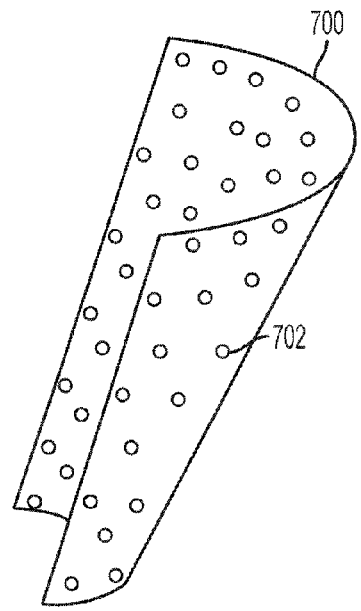
FIG. 7A is a perspective view of a diffuser skirt according to an exemplary embodiment.

Referring now to FIG. 7A, there is shown a perspective view of a diffuser skirt according to an exemplary embodiment. In a typical embodiment, a diffuser skirt 700 comprises a plurality of apertures 702. The plurality of apertures 702 are illustrated by way of example in FIG. 7A as being evenly spaced around the diffuser skirt 700; however, the plurality of apertures 702 may, in alternative embodiments, be grouped to create a specific fluid flow. In a typical embodiment the diffuser skirt 700 is substantially convex shaped. The diffuser skirt 700 may be, for example, roughly infundibular or quasi-frustoconical in shape.

Figure 7B:
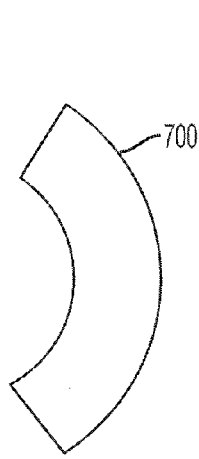
FIGS. 7B-7E are top-plan views of diffuser skirts according to exemplary embodiments.
Figure 7C:
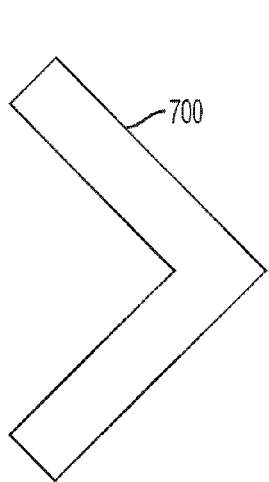
Figure 7D:
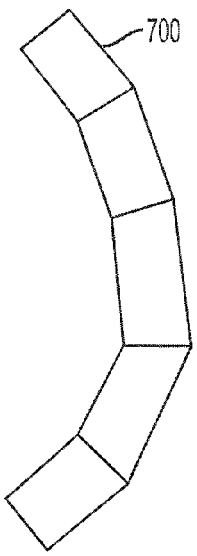
Figure 7E:
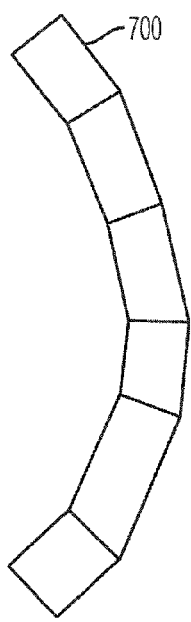

FIGS. 7B-7E illustrate various exemplary shapes of the diffuser skirt 700. FIG. 7B illustrates the diffuser skirt 700 as chevron shaped. FIG. 7C illustrates the diffuser skirt 700 as pentagon-shaped, FIG. 7D illustrates the diffuser skirt 700 as open hexagon-shaped. FIG. 7E illustrates the diffuser skirt 700 as an open polygon or any other appropriate shape.

Figure 7F:
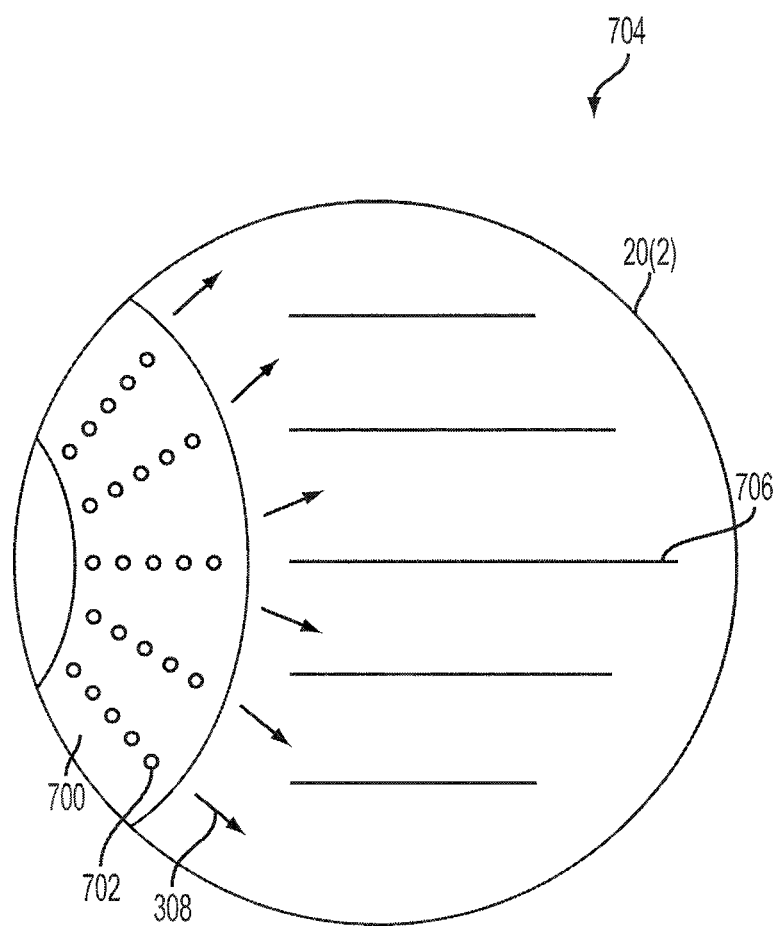
FIG. 7F is a top-plan, diagrammatic view of a tray according to an exemplary embodiment.

Referring specifically to FIG. 7F, there is shown a top-plane, diagrammatic view of a tray according to an exemplary embodiment. In a typical embodiment, a tray 704 includes a diffuser skirt 700 having a plurality of apertures 702 therein. In a typical embodiment, the diffuser skirt 700 is substantially arc-shaped. In a typical embodiment, the diffuser skirt 700 may be, for example, roughly infundibular or quasi-frustoconical in shape. During operation, the continuous-phase fluid 308 moves through the plurality of apertures 702 at an approximate right angle to the diffuser skirt 700. The roughly arcuate profile of the diffuser skirt 700 facilitates directing the continuous-phase fluid 308 over the entire volumetric cross-flow window between successive trays such as, for example, the tray 704. In various embodiments, tabs 64 (shown in FIG. 4) may be incorporated with the plurality of apertures 702 to direct the continuous-phase fluid 308 in a desired direction thereby inducing the continuous-phase fluid 308 to cover the entire volumetric cross-flow window between the successive trays such as, for example, the trays 502(1)-502(2) (shown in FIG. 5). Additionally, at least one or a plurality of vanes 706 may be incorporated to impart additional velocity to the continuous-phase fluid 308 and to further direct the continuous-phase fluid 308 to cover the entire volumetric cross-flow window of a tray such as, for example, the tray 704. The vanes 706 may be curved, angled, or straight to reduce eddy currents in the continuous-phase fluid 308 and the dispersed-phase fluid 310 (not explicitly shown in FIG. 7). The plurality of apertures 702 are illustrated by way of example in FIG. 7F as being evenly spaced around the diffuser skirt 700; however, the plurality of apertures 702 may, in alternative embodiments, be grouped to direct the continuous-phase fluid 308 to cover an entire volumetric cross-flow window of the tray 704.

Figure 8:
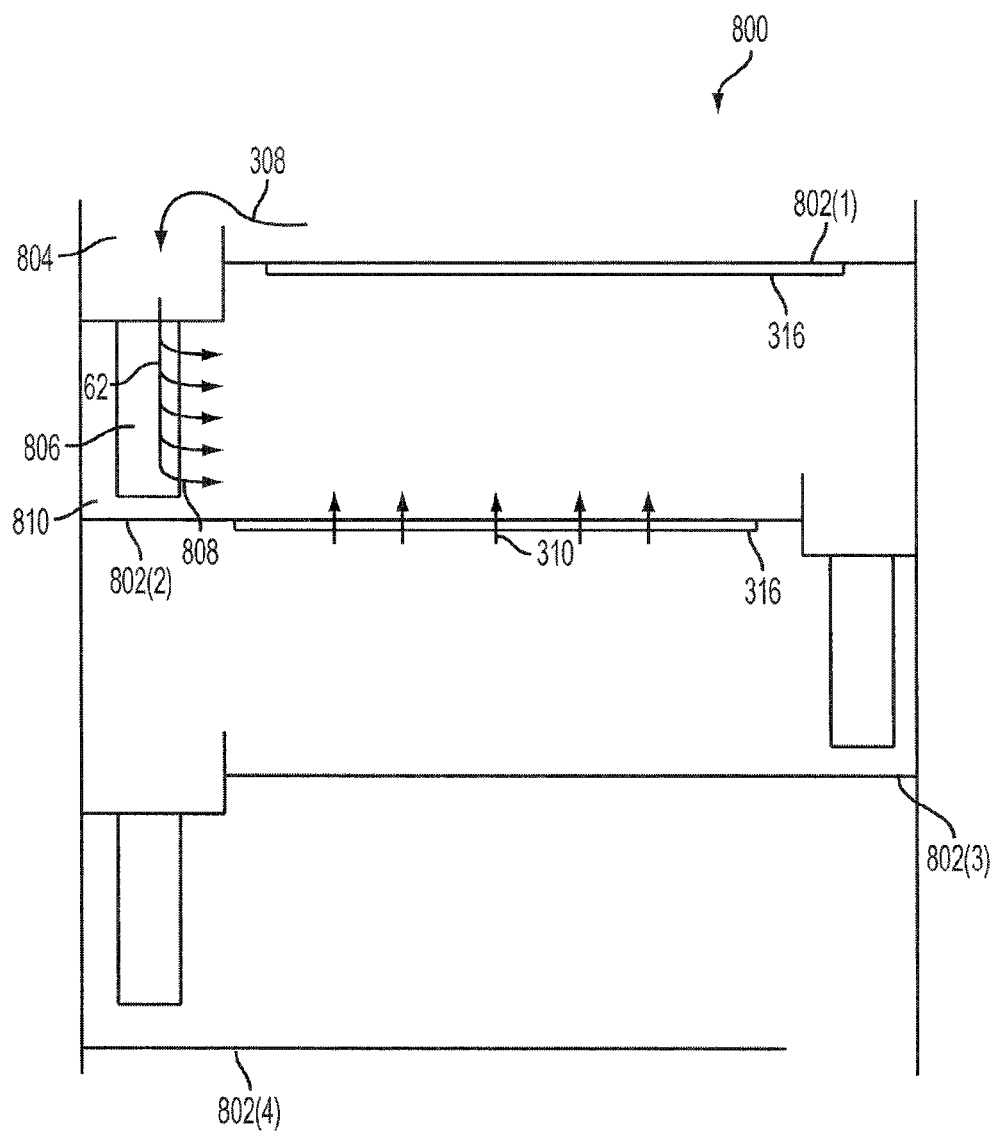
FIG. 8 is a diagrammatic, side-elevational, cross-sectional view of a fluid-fluid exchange column according to an exemplary embodiment.

Referring now to FIG. 8, there is shown a diagrammatic, side-elevational, cross-sectional view of a fluid-fluid exchange column according to an exemplary embodiment. A fluid-fluid exchange column 800 includes a plurality of trays 802(1)-802(4). In a typical embodiment, a tray such as, for example, the tray 802(2) allows fluid to enter and exit via fluid channels 804. In various embodiments, the plurality of fluid channels 804 may include, for example, a downcomer or an upcomer as described hereinabove. In a various embodiments, the fluid channels 804 include at least one of the plurality of orifice constrictions 306(*a*)-306(*c*) (shown in FIG. 3) discussed above with respect to FIG. 3 disposed therein. A downspout 806, having a plurality of apertures 808 therein, depends from an underside of the fluid channel 804. As shown by way of example in FIG. 8, the downspout 806 extends substantially between two successive trays such as, for example, the tray 802(1) and the tray 802(2) leaving a clearance gap 810 between the downspout 806 and the tray 802(2); however, one skilled in the art will recognize that, in alternative embodiments, the downspout 806 may extend entirely to the tray 802(2) leaving no clearance space. Although, the plurality of apertures 808 are shown by way of example in FIG. 8 as perforations; one skilled in the art will recognize that, in alternative embodiments, the plurality of apertures 808 could include slots, louvers, or the like. The plurality of apertures 808 are illustrated by way of example in FIG. 8 as being evenly spaced around the downspout 806; however, the plurality of apertures 808 may alternatively be grouped to create a specific fluid flow. By way of example, the fluid-fluid exchange column 800 is illustrated as including four trays 802(1)-802(4); however, one skilled in the art will recognize that, in alternative embodiments, any number of trays could be utilized.

Still Referring to FIG. 8, in certain embodiments, the coalescing element 316 may be included on the any of the plurality of trays 802(1)-802(4) to facilitate coalescing of the dispersed-phase fluid 310. Although the coalescing element 316 is shown in FIG. 8 as being disposed on an underside of the plurality of trays 802(1)-802(4), one skilled in the art will recognize that, in alternative embodiments, the coalescing element 316 could be located on a top surface of the plurality of trays 802(1)-802(4) in cases where the dispersed-phase fluid 310 is heavier than the continuous-phase fluid 308.

Still referring to FIG. 8, during operation, a continuous-phase fluid 308 moves across a tray such as, for example, the tray 802(1), into the fluid channel 804, and through at least one of the orifice constrictions 306(*a*)-306(*c*). As the continuous-phase fluid 308 moves through the downspout 806, the flow restriction imposed by the plurality of apertures 808 results in velocity being imparted to the continuous-phase fluid 308. The added velocity also facilitates stirring and mixing of the continuous-phase fluid 308 and the dispersed-phase fluid 310. Such added velocity also forces the continuous-phase fluid 308 to be dispersed across an entire volumetric cross-flow window between successive trays such as, for example, the tray 802(1) and the tray 802(2) thus preventing stagnation and recirculation. Additionally, thrust tabs (not explicitly shown in FIG. 8) may be incorporated in conjunction with the plurality of apertures 808 to direct the continuous-phase fluid 308 to cover the entire volumetric cross-flow window of the plurality of trays 802(1)-802(4).

Figure 9A:
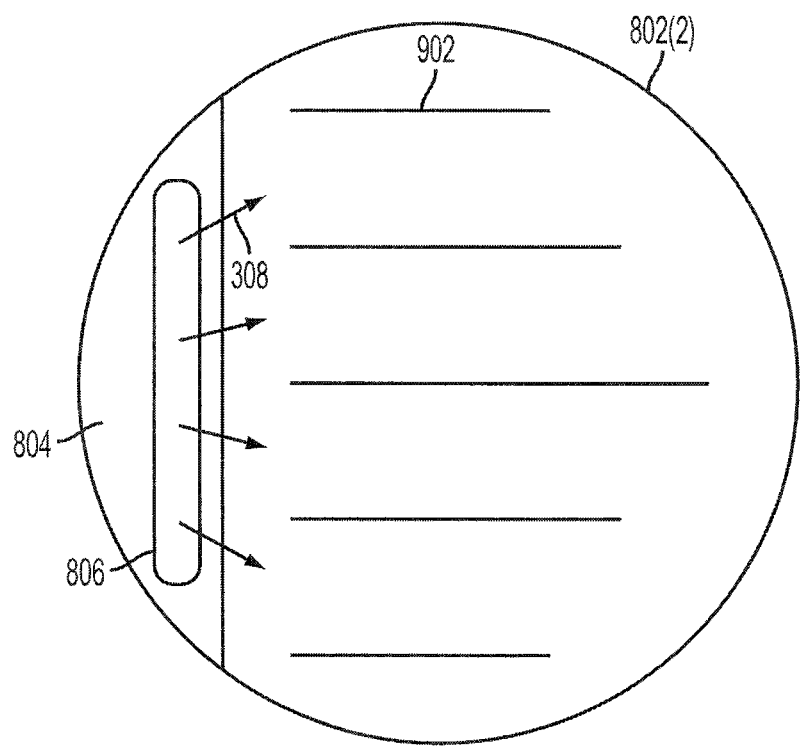
FIG. 9A is a top-plan, diagrammatic view of a tray according to an exemplary embodiment.
Figure 9B:
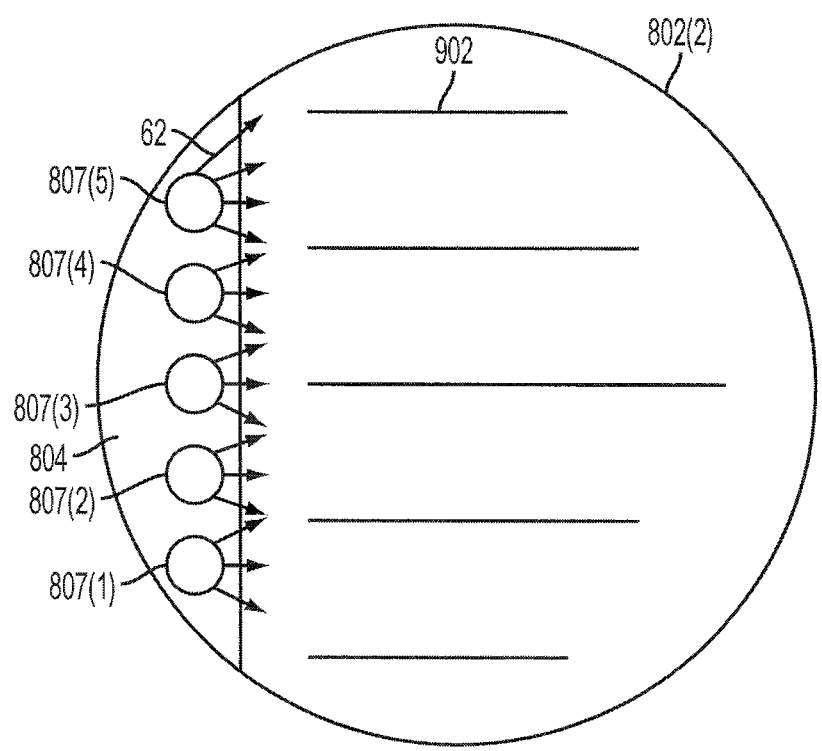
FIG. 9B is a top-plan, diagrammatic view of a tray according to an exemplary embodiment.

Referring now to FIGS. 9A and 9B, there is shown a top-plane, diagrammatic view of a tray according to an exemplary embodiment. In a typical embodiment a tray such as, for example, the tray 802(2) includes the fluid channel 804 and the downspout 806. In a typical embodiment, the downspout 806 can be seen disposed within the fluid channel 804. As shown in FIG. 9A, in certain embodiments, a single downspout 806 may be included in the fluid channel 804. However, as illustrated in FIG. 9B, in certain alternative embodiments, multiple downspouts 807(1)-807(5) may be included in the fluid channel 804. As previously illustrated in FIG. 4, thrust tabs (not explicitly shown in FIGS. 9A and 9B) may be incorporated with the plurality of apertures (not explicitly shown in FIGS. 9A and 9B) to direct the continuous-phase fluid 308 in a desired direction thereby inducing the continuous-phase fluid 308 to cover the entire volumetric cross-flow area of a tray such as, for example, the tray 802(2). Additionally, at least one or a plurality of vanes 902 may be incorporated to impart additional velocity to the continuous-phase fluid 308 and to further direct the continuous-phase fluid 308 to cover the entire volumetric cross-flow window of a tray such as, for example, the tray 802(2). The vanes 902 may be curved, angled, or straight to reduce eddy currents in the continuous-phase fluid 308 and the dispersed-phase fluid 310 (not explicitly shown in FIG. 9).

It is thus believed that the operation and construction of the present invention will be apparent from the foregoing description. Although the method and apparatus shown or described has been characterized as being preferred it will be obvious that various changes and modifications may be made therein without departing from the spirit and scope of the invention as defined in the following claims. For example, most embodiments are described herein as having a heavier fluid in a continuous phase; however, one skilled in the art will recognize that a lighter fluid could comprise the continuous phase with minimal change to the structure of the fluid-fluid exchange column. By way of further example, the principles disclosed herein are applicable to various types of separations trays including, for example, valve trays, sieve trays, and the like. Furthermore, the features discussed above with respect to FIGS. 1-9 may be combined and rearranged in numerous advantageous ways that will be apparent to one of ordinary skill in the art. For example, although specific embodiments are discussed herein that have various features such as lighter fluid slots, ridges, and thrust tabs, it is fully contemplated that other advantageous embodiments may have any combination of or even multiple instances of these features. Finally, specific embodiments are illustrated herein as pertaining to single-pass trays with a serpentine flow path; however, one skilled in the art will recognize that the principles disclosed herein could be applicable to separations trays having numerous types of flow paths including, for example, dual-pass, multiple pass, orbital flow, and uni-directional flow.

Figure 10:
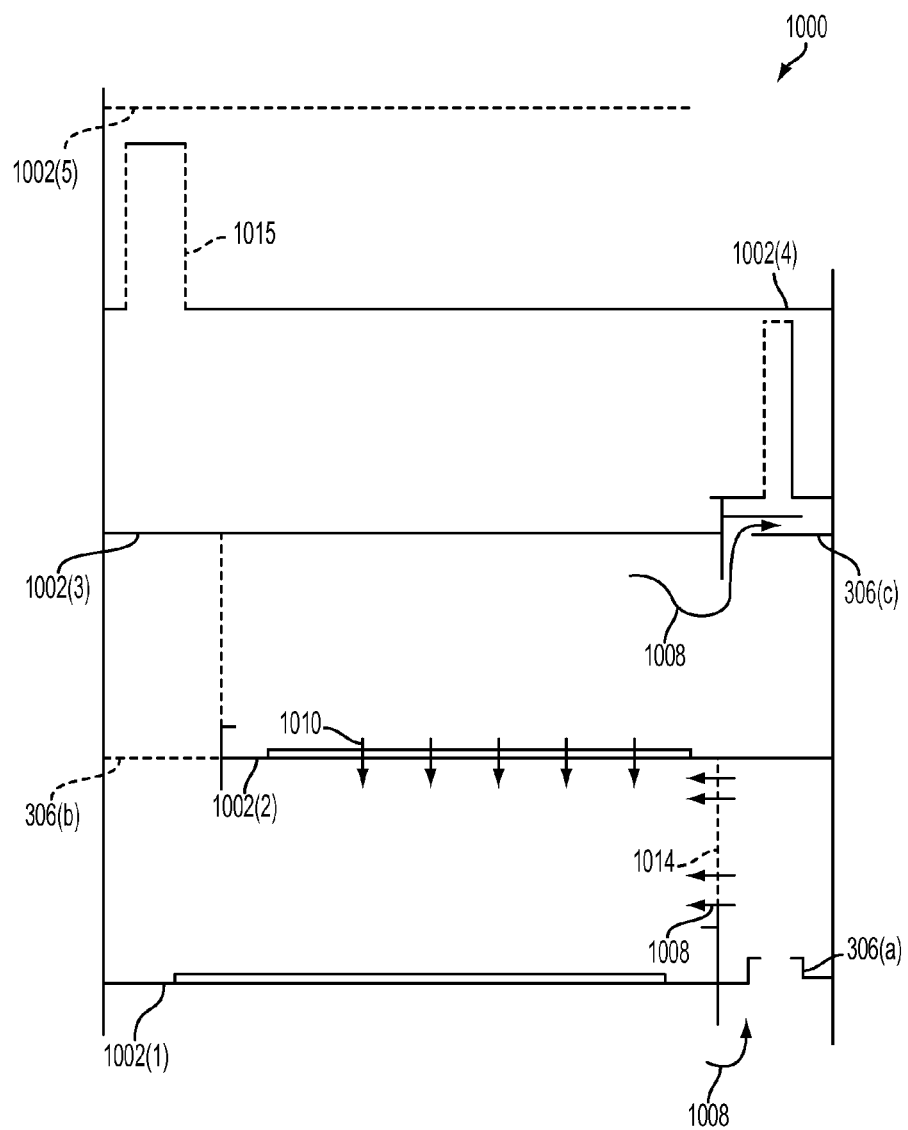
FIG. 10 is a is a diagrammatic, side-elevational, cross-sectional view of a fluid-fluid exchange column according to an exemplary embodiment.

FIG. 10 is a is a diagrammatic, side-elevational, cross-sectional view of a fluid-fluid exchange column according to an exemplary embodiment. In a typical embodiment, a fluid-fluid exchange column 1000 is constructed similar to any of, for example, the fluid-fluid exchange columns 300, 500, or 800 shown in FIGS. 3, 5, and 8. In a typical embodiment, a continuous-phase fluid 1008 is a light fluid and thus flows from a bottom portion to a top portion of the fluid-fluid exchange column 1000. Likewise, a dispersed-phase fluid 1010 is a heavy fluid and thus flows from a top portion to a bottom portion of the fluid-fluid exchange column 1000. In a typical embodiment, during operation, the continuous-phase fluid 1008 moves across a tray such as, for example, the tray 1002(1), into a fluid channel 1004, and through at least one of the plurality of orifice constrictions 306(a)-306(c). As the continuous-phase fluid 1008 moves through at least one of the plurality of orifice constrictions 306(a)-306(c), flow of the continuous-phase fluid 1008 is restricted resulting in increased velocity of the continuous-phase fluid 1008. The added velocity further facilitates stirring and mixing of the continuous-phase fluid 1008 and the dispersed-phase fluid 1010 forcing the continuous-phase fluid 1008 to be spread entirely across a cross-flow volumetric window between successive trays such as, for example, the trays 1002(1) and 1002(2) preventing stagnation and reducing recirculation (also referred to as "eddy current") in the continuous-phase fluid 1008. Additionally, according to an exemplary embodiment, thrust tabs (not explicitly shown in FIG. 10) may be incorporated in conjunction with a plurality of apertures 1014 or 1015 to direct the continuous-phase fluid 1008 to cover the entire volumetric cross-flow window between each of the plurality of trays 1002(1)-1002(5). FIG. 10 is included herein to demonstrate that either a heavier fluid or a lighter fluid may be used in operation as the continuous phase with appropriate modifications to a structure of the fluid-fluid exchange column.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A tray assembly for use in a fluid-fluid exchange column, the tray assembly comprising:
   a plurality of trays, each of the plurality of trays comprising:
      a tray deck having a plurality of apertures disposed therein;
      a fluid channel fluidly coupling at least two trays of the plurality of trays;
      a diffuser skirt operatively coupled to at least one tray of the plurality of trays, the diffuser skirt in fluid communication with the fluid channel and comprising a plurality of apertures;
         wherein the diffuser skirt distributes a continuous phase fluid over substantially an entire surface of the tray deck; and
      wherein the diffuser skirt reduces recirculation of the continuous phase fluid.

2. The tray assembly of claim 1 further comprising:
   a coalescing element disposed on a side of the tray deck facing a flow of a dispersed phase fluid; and
   wherein the coalescing element operable to promote coalescing of the dispersed phase fluid.

3. The tray assembly of claim 1 comprising a serpentine flow of the continuous phase fluid.

4. The tray assembly of claim 1 comprising a uni-directional flow of the continuous phase fluid.

5. The tray assembly of claim 1 comprising an orbital flow of the continuous phase fluid.

6. The tray assembly of claim 1, wherein the fluid channel is a downcomer.

7. The tray assembly of claim 1, wherein the fluid channel is an upcomer.

8. The tray assembly of claim 1 further comprising a plurality of baffles disposed on the tray deck.

9. The tray assembly of claim 8, wherein the plurality of baffles distribute the continuous phase fluid over a surface of the tray deck.

10. The tray assembly of claim 1, wherein the plurality of trays are single-pass trays.

11. The tray assembly of claim 1, wherein the plurality of trays are multi-pass trays.

12. The tray assembly of claim 1, where in the plurality of trays comprise multiple downspouts.

13. A method of diffusing fluid phases in a fluid-fluid exchange column, the method comprising:
   providing a fluid-fluid exchange column comprising:
      a plurality of trays;
      at least one diffuser skirt operatively coupled to each of the plurality of trays;
   flowing a first fluid across successive trays in a serpentine flow path;
   diffusing the first fluid through a diffuser skirt thereby distributing the continuous phase fluid over substantially an entire surface of the tray;
   dispersing a second fluid within the first fluid; and
   flowing the second fluid through a plurality of apertures disposed in the plurality of trays.

14. The method of claim 13 further comprising directing the first fluid, via the diffuser skirt, in a desired direction.

15. The method of claim 13, wherein the first fluid is a heavy fluid and the second fluid is a light fluid.

16. The method of claim 13, wherein the first fluid is a light fluid and the second fluid is a heavy fluid.

17. A diffuser skirt for use in a fluid-fluid exchange column having a plurality of trays associated therewith, the diffuser skirt comprising:
   a diffuser body having a plurality of apertures disposed therein;
   wherein the diffuser body is operatively coupled to at least one of the plurality of trays;
   wherein the diffuser body distributes a continuous phase fluid over substantially an entire surface of at least one of the plurality of trays; and
   wherein the diffuser body reduces recirculation of the continuous phase fluid.

18. The diffuser skirt of claim 17, wherein the diffuser body comprises a conduit.

19. The diffuser skirt of claim 18, wherein the plurality of apertures are disposed on both an interior face and an exterior face of the conduit.

20. The diffuser skirt of claim 17, wherein the plurality of apertures are grouped to create a desired flow pattern.

21. The diffuser skirt of claim 17, wherein the plurality of apertures comprise at least one of a slot, a louver, and a thrust tab.

22. The diffuser skirt of claim 17, wherein the diffuser body is angled toward an exterior wall of the fluid-fluid exchange column.

23. The diffuser skirt of claim 17, wherein the diffuser body comprises at least one of a semi-circular shape, a chevron shape, or a polygonal shape.

* * * * *